Feb. 18, 1947. M. H. LERCHE 2,416,104
DETACHABLE WING TIP TANK
Filed March 22, 1944  3 Sheets-Sheet 3
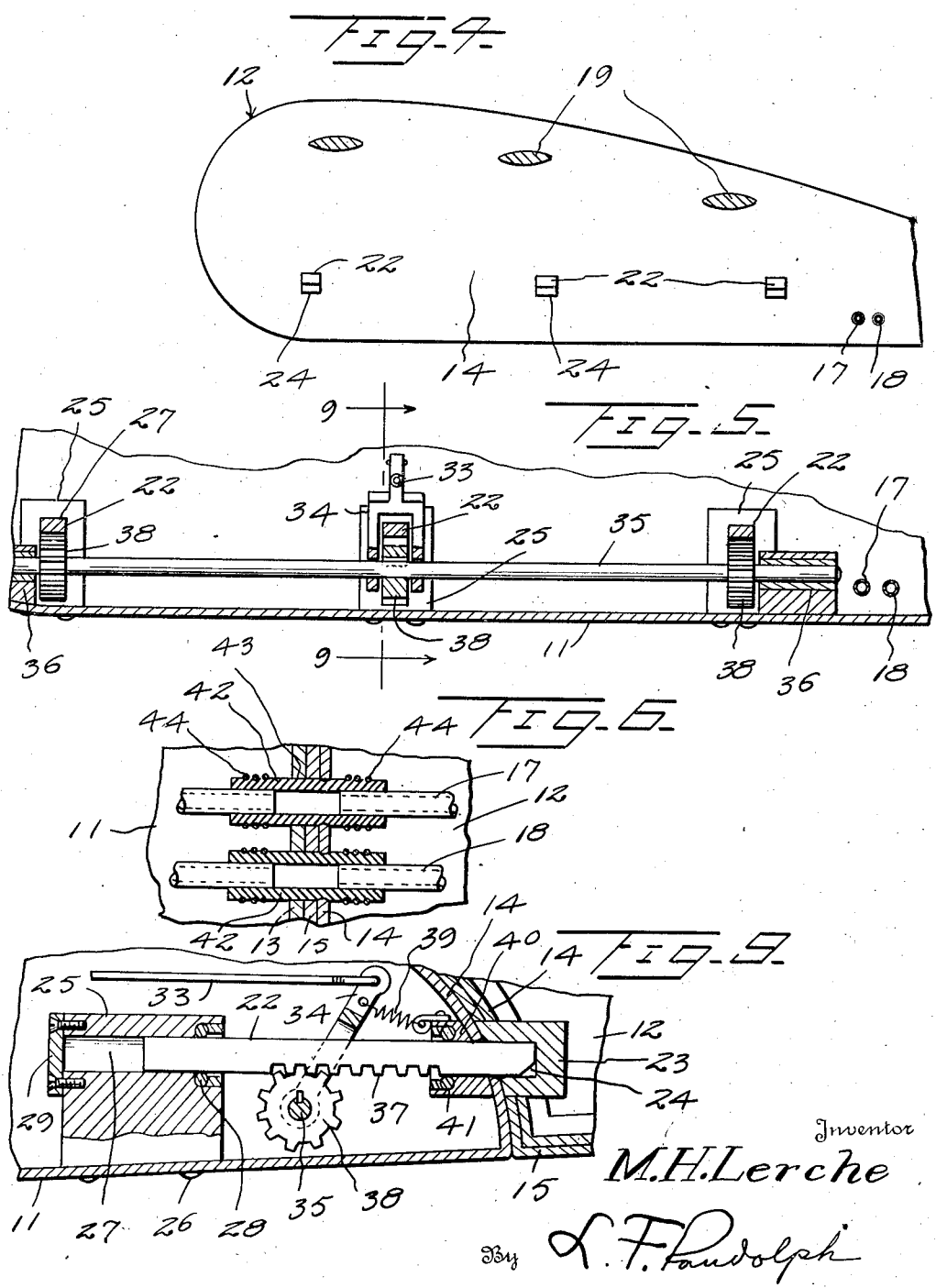

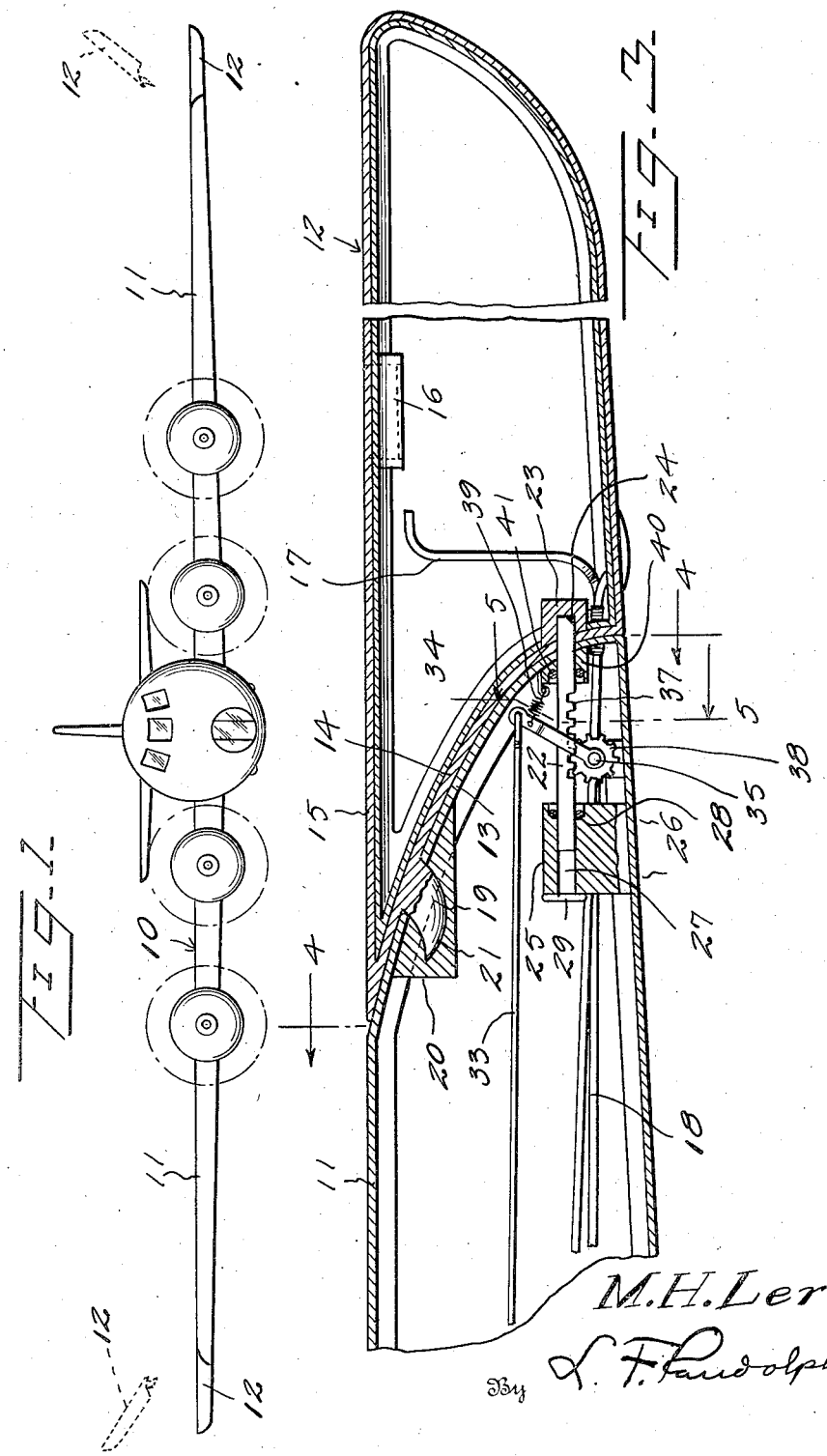

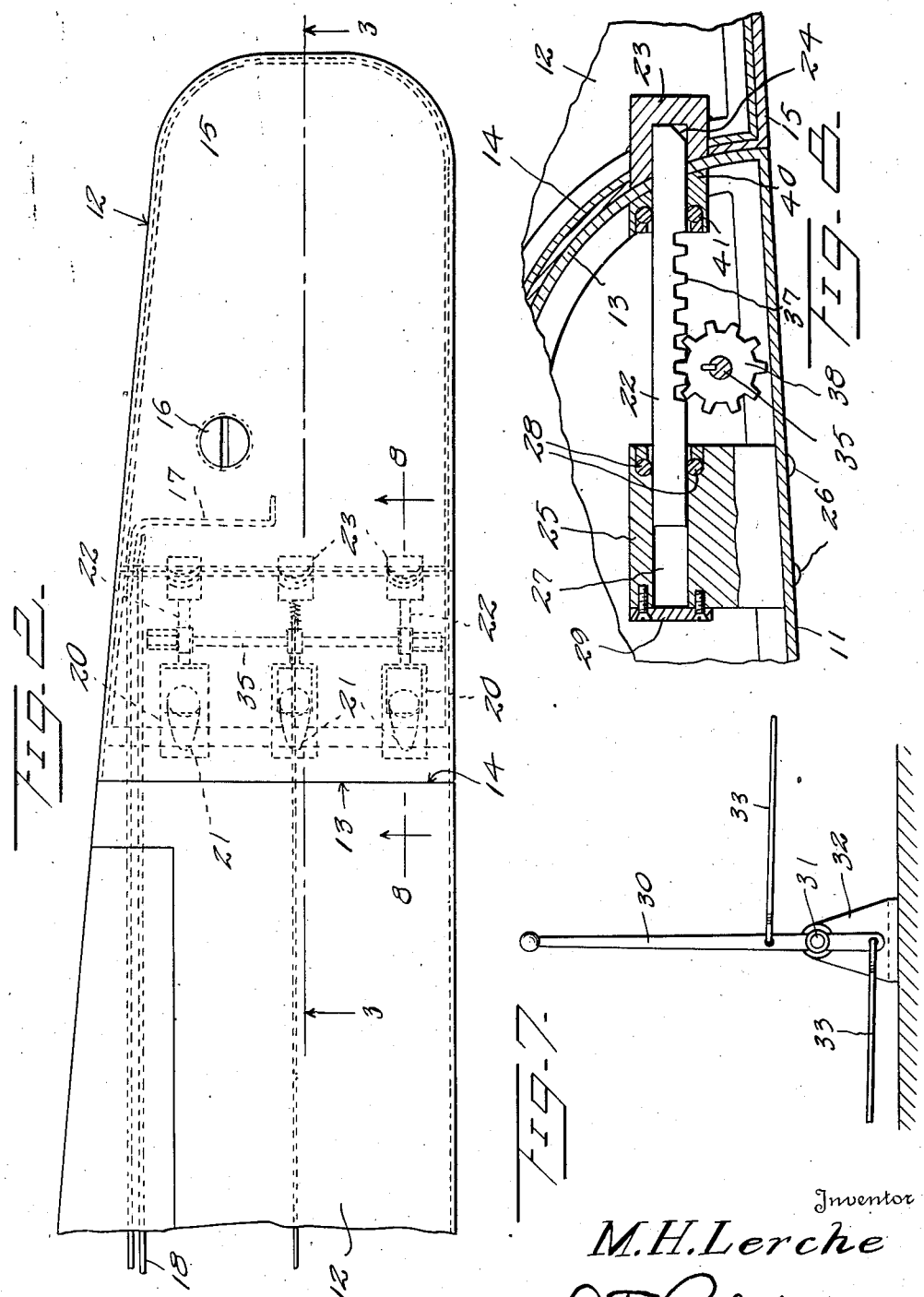

Patented Feb. 18, 1947

2,416,104

UNITED STATES PATENT OFFICE 2,416,104

DETACHABLE WING TIP TANK

Myron H. Lerche, Hilbert, Wis.

Application March 22, 1944, Serial No. 527,560

2 Claims. (Cl. 244—135)

This invention relates to means which will enable aircraft to carry a heavier load further than existing planes and yet be able to return to base quicker, being especially useful for military purposes as a bombing plane.

It is especially aimed to provide a structure of plane wherein the wing or wings have tanks at the tips thereof to carry fuel to be initially used on the cruise and before using the normal fuel supply, the wing tanks affording more wing area and the additional fuel providing for a greater cruising range.

It is also aimed to provide such wing-tip tanks as are readily releasable and detachable so that after the wing-tip tanks are empty and an emergency arises and more speed is desired, such tanks may be released to become detached from the plane, the plane being then able to travel on its normal fuel supply.

A further object is to provide novel means whereby the wing-tip tank or tanks are securely attached to the tips of the wings and are readily releasable from the cockpit of the plane.

The more specific objects and advantages will become apparent from a consideration of the description following taken in connection with accompanying drawings illustrating an operative embodiment.

In said drawings—

Figure 1 is a front elevation of aircraft equipped with my improvement, the detachment of the wing-tip tanks being suggested in dotted lines;

Figure 2 is an enlarged plan view of one of the wing-tip tanks and adjacent portion of a wing to which it is attached;

Figure 3 is a longitudinal section taken on the line 3—3 of Figure 2;

Figure 4 is a detail section taken on the line 4—4 of Figure 3;

Figure 5 is a detail section taken on the line 5—5 of Figure 3;

Figure 6 is a detail section taken on the line 6—6 of Figure 3;

Figure 7 is a detail of a releasing lever and associated parts;

Figure 8 is a detail section taken on the line 8—8 of Figure 2; and

Figure 9 is a section taken on the line 9—9 of Figure 5.

Referring specifically to the drawings wherein like reference characters designate like or similar parts, a representative or conventional aircraft is shown at 10. Whether a monoplane, biplane or regardless of the number of planes, any one or more of them at its tips is provided with a suitably shaped detachable fuel tank generally designated 12. The wings in the example of the plane shown are indicated at 11. Said tanks 12 are shaped to merge with the outer surface of the associated wing 11. The end surface of the wing which is directly engageable by the tank, has a practical shape, being for instance rounded as at 13 and appropriately reinforced. The tank 12 has an end wall 14 which is concave and intimately conforms to the shape of the wall 13. The tank 12 is made of any suitable material and may be provided with an external skin 15.

The tanks 12 are adapted to contain a supply of hydrocarbon fuel and to this end have a filling opening normally covered by a removable closure 16.

It is to be understood that the supply of fuel in the supplemental or wing-tip tanks 12 is additional or supplemental to the normal fueling system and tanks of the aircraft 10. In flight, however, the fuel from the tank 12 is adapted to be first used in operating the motors of the aircraft, following which such motors are operated from the normal or usual supply or tank of fuel thereon. Pressure from any suitable source is applied to the contents of the tanks through a conduit 17 and the fuel under the urgency of such pressure is supplied to the operating motors of the aircraft through a supply conduit or pipe 18. It is to be understood that suitable connections are made in any desired manner whereby the fuel from either or all of the tanks 12 is appropriately connected to supply the motors of the aircraft 10 under valved control.

The tanks 12 constitute extensions of the wings 11 and they are detachably connected to the latter in a suitable manner. For instance, along the wall 14 and projecting therefrom are one or more hooks or lugs 19 which are detachably entered in socket members 20 fastened to the wall 13 and having sockets 21, which receive the lugs 19 and which open through such walls 13. In addition, any desired number of latch bars or elements 22 are movable in openings in the walls 13 and 14 for coaction with keepers 23 located interiorly of the tank. Such latch elements 22 are preferably beveled or cut away at one corner as at 24 to facilitate the entry thereof into the keepers.

Preferably three of the latch elements 22 may be used although no limitation is to be implied. These elements are slidably mounted and guided in blocks 25 fastened at 26 within the wings 11. Such elements 22 are entered in slots 27 of the blocks 25 and they travel on friction-reducing rollers or balls 26 therein. Stop elements 29 are provided on the blocks to close one end of the slots 27.

All of the latch elements 22 are operable by a single means from the cockpit of the aircraft and preferably through the manipulation of a lever 30 pivoted at 31 to a suitable mounting 32 in such cockpit. Extending from the lever 30 on opposite sides of the pivot 31 and in opposite directions are rods or cables 33 which lead to cranks 34 attached to shafts 35 disposed at a right angle to the latch elements 22 and beneath the same and journaled in suitable bearings within the wings 11. Each of the latch elements 22 has rack teeth 37 enmeshed with a pinion 38 keyed to the adjacent shaft 35. Such latch elements are held in latched position through the contractile action of coil springs 39 attached to the crank 34 and to guides 40 opposed to the keepers 23. Such guides 40 are carried by the wings 11 and may have balls or rollers 41 therein, engaged by the latch elements for movement of the latter with minimum friction.

As will best be seen from Figure 6, the conduits 17 and 18 are in sections carried one by the wing and one by the tank 12. Such sections may be joined by flexible hose or rigid hose as at 42 in liquid-tight relation to the tank 12. The hose is at least separable and readily detachable by pulling out of the openings 43 in the wall 13 under the weight of a released tank 12, and will also readily pull off of the sections of conduits 17 and 18 within the wings 11. Wires 44 may be wound around the tubes 42 to provide better joints between the latter and the sections of the conduits 17 and 18. These wires will not, however, interfere with ready separation of the tanks from the wings.

It will be understood that in operation, the aircraft is operated initially on the flight with fuel taken from the wing-tip or supplemental tanks 12, and thereafter is operative from its usual or normal source of supply. The construction enables the plane to carry a greater load, for instance, a greater load of bombs, farther than existing planes and at the same time will enable the plane to return quicker or faster. The wing-tip tanks increase the wing area while the additional fuel gives a longer cruising range. Should an emergency arise and more speed be required, the wing-tip tanks are adapted for immediate release through the operation of the lever 30 to the end that the element 33 will rock shaft 35 so that the pinions 38 will retract the latch elements 22 and enable the wing-tip or auxiliary tanks 12 to fall off of and be completely detached from the plane. Under these circumstances, the plane continues to operate on its normal supply of fuel which is held in reserve as far as practical.

Various changes may be resorted to provided they fall within the spirit and scope of the invention.

I claim as my invention:

1. In an aircraft including a fuselage and lateral wings, said wings being provided with detachable wing tips of hollow construction defining fuel tanks, fuel conduit means between the wing tips and the fuselage and means for readily detaching the tips from the wings proper, said means consisting of upper sockets in the ends of the wings proper having curved recesses, curved hooks on the adjacent ends of the tip sections, and lower slide-bolts carried by the outer ends of the wings proper, said wing sections being provided with sockets for receiving said bolts.

2. In an aircraft including a fuselage and lateral wings, said wings being provided with detachable wing tips of hollow construction defining fuel tanks, fuel conduit means between the wing tips and the fuselage and means for readily detaching the tips from the wings proper, said means consisting of upper sockets in the ends of the wings proper having curved recesses, curved hooks on the adjacent ends of the tip sections, and lower slide-bolts carried by the outer ends of the wings proper, said wing sections being provided with sockets for receiving said bolts, each of said wings proper having a block therein provided with a slideway in which the adjacent end of the corresponding bolt is slideable and a removable slide plate on the block covering one end of the said slideway.

MYRON H. LERCHE.

REFERENCES CITED

The following references are of record in the file of this patent:

UNITED STATES PATENTS

| Number | Name | Date |
| --- | --- | --- |
| 2,105,307 | Akerman | Jan. 11, 1938 |
| 2,283,223 | Nallinger | May 19, 1942 |
| 1,996,281 | Dolan | Apr. 2, 1935 |
| 2,010,817 | Henry | Aug. 13, 1935 |
| 2,375,423 | Lobelle | May 8, 1945 |
| 2,375,858 | Makaroff | May 15, 1945 |
| 1,180,967 | Billing | Apr. 25, 1916 |
| 1,731,757 | Tubbe | Oct. 15, 1929 |
| 2,196,546 | Bowers | Apr. 9, 1940 |
| 2,234,404 | Grimes | Mar. 11, 1941 |